United States Patent Office 3,498,807
Patented Mar. 3, 1970

3,498,807
SILICATE BINDER AND PROCESS FOR MAKING THE SAME
Ralph R. Gresham, Houston, Tex., assignor of one-half to Ralph L. Lowe, Houston, Tex.
No Drawing. Filed July 16, 1965, Ser. No. 472,716
Int. Cl. C09j 1/02
U.S. Cl. 106—74                                    3 Claims

ABSTRACT OF THE DISCLOSURE

A binder composition and process for making the same, said binder comprising the product formed by reacting boiling sodium silicate with a water solution of boric acid in an amount sufficient to provide 0.02 to 0.09 part boric acid for each part sodium silicate.

---

The present invention relates to silicate binders and to processes for producing them. More particularly, the invention relates to binders or bonding agents of the type containing sodium silicate or water glass, and to a process for producing such bonding agents.

The use of soluble silicates for adhesives, cements, fireproofing paints, and fluxes for welding and soldering, have been widely investigated and applied. These uses have produced many patents and approaches as outlined by Vail and Willis in "Soluble Silicates—Their Properties and Uses" volumes 1 and 2, Reinhold Publishing Co., New York (1952). Today, many soluble silicates are available in both solid and liquid form. A solution of sodium silicate or water glass is today conventionally prepared by either reducing the solid glass to a melt at about 1400 to 1500° C., and then drawing the melt into water in a rotating dissolver, or by casting molten glass into blocks and adding the same to a stationary pressure dissolver. In the former process the contact of the melt with the water causes the production of granular glass particles which are in turn dissolved by the water at approximately 100° C. When a solution of the desired strength has been attained, the silicate solution is withdrawn and water added to the residue remaining in the dissolver. At all times during this solution, it is necessary to maintain an excess of granular particles with respect to the water added to the dissolver.

In the second process, the blocks of sodium silicate are covered with water and then heated to a steam pressure of 90 to 100 lbs. gage. Liquid silicate is blown off into a vessel when the desired concentration has been reached. The dissolver is then opened and more glass and water is added. In this process, approximately one-third of the added sodium silicate blocks are dissolved per charge.

The two procedures outlined are not adapted to small scale operations and require a great deal of care to prevent the formation of a solid mass within the dissolvers. Likewise, a solution of silicate glass may be prepared in an atmospheric dissolver similar to the pressure dissolver. However removal of solutions of desired sodium silicate content is difficult and a solid can be obtained in the dissolver without recovery of the desired yield of sodium silicate solution.

The principal object of the present invention is to produce a soluble silicate containing binder which, when used as a bonding agent, results in a clear, stable fire- and water-resistant product.

A related object of this invention is to facilitate the production of a soluble silicate bonding agent by means of a large or small installation and with relatively inexpensive equipment.

Another object of the present invention is to produce a liquid bonding agent having low viscosity, excellent strength, high durability, extreme high temperature resistance and a substantial water resistance.

A further object of the present invention is to produce a silicate containing bonding agent which is stable, has a high shelf life, and when dry, exhibits minimum alkali leaching tendencies.

A more specific object of the invention is to provide a bonding agent which is clear, waterproof, flexible, refractory and which at the same time produces an exceptionally strong and leachproof bond.

It is a more detailed object of the invention to produce such a bonding agent for use as a binder for asbestos, vermiculite, pearlite, sawdust and other particulate inorganic or organic materials.

Still another object of the present invention is to produce a bonding agent of the foregoing characteristics which has outstanding film forming characteristics so to be useful in paints and other coating agents.

Another object of the present invention is to provide a process for producing a soluble silicate which may be carried out at atmospheric pressure, in inexpensive equipment, and with only a short process time.

Still another object of the present invention is to provide a soluble silicate containing bonding agent which may be used as a paint binder and clear coating, and when so used will not support combustion, provides a tough waterproof film, mixes well with ordinary pigments and extenders, flows easily and can be sprayed, brushed or rolled.

Still another object of the invention is to provide a soluble silicate bonding agent which is watery in appearance, has a low viscosity and is not affected by temperature changes.

Still a further object of the invention is to provide silicate containing bonding agent which is tough, hard and yet relatively flexible so as to be suitable for coating on metal, paper and like materials.

While certain illustrative embodiments of the present invention are herein described in considerable detail, it should be understood that there is no intention to limit the invention to the specific forms and modifications disclosed. On the contrary, the intention is to cover all modifications, alternative steps, equivalents, and uses falling within the spirit and scope of the invention as expressed in the appended claims.

The process of the present invention obviates many of the objections to conventional procedures for the production of sodium silicate solutions; namely, the process may be applied to small scale production—thus saving freight cost associated with shipping solutions—the process is less critical of control in order to prevent undesired solidification within the dissolver, and the process permits controlled formulation of the end product. To this end, the present invention contemplates the production of a soluble silicate solution starting wtih solid silicate glass, and the reaction with that solution of a particular amount of boric acid, also added as a solution, to produce a stable, low viscosity, clear, bonding agent capable of producing a strong, tough, bond when mixed with particulate materials and allowed to set.

While various commercial compositions of sodium silicate are available, it is preferred for the present process and bonding agent to use a commercial sodium silicate glass having a ratio of sodium to silica of 1 to 3.25 ($Na_2O:3.25\ SiO_2$) which silicate is a conventional, soluble, sodium silicate, available in either solid or liquid form from a number of commercial sources. In the solid form, this substance is referred to as soluble sodium silicate glass, while in liquid form, containing about 39% silicate, it is commercially referred to as "water glass." While sodium silicates having a ratio of silicate to sodium of from 2.35 to 1 to 3.5 to 1 are available, those commercial silicates having a ratio of about 2.85 to 1 to about 3.5 to 1 have been found to be most suitable. Among the available sources of these silicates are the Diamond Alkali Company and Allied Chemical Company.

In the process embodying the present invention, solid, sodium silicate glass having a sodium to silica ratio of 1 to 3.25 ($Na_2O:3.25\ SiO_2$) is first crushed to a mesh size of 20 mesh or smaller. It has been observed that the smaller the particle size the more quickly the silicate can be dissolved. The crushed silicate is then placed in a gas or electric heated dissolver, together with sufficient water to produce a solution containing between about 25 and about 30 percent solids. For example, it has been found that by adding to the dissolver 5 parts by weight of crushed glass and 10 parts by weight water, the desired concentration of solution can be obtained. The crushed glass particles settle at the bottom of the dissolver and are subjected to the highest temperature. This crushed glass has been observed to melt to form a highly viscous, molten layer at the bottom of the dissolver. The boiling water above this melt appears to pull the molten silicate into solution to form an aqueous sodium silicate solution.

It has been found that gas heat produces a vigorous agitation and is most desirable, although electric heat together with stirring of the solution, is satisfactory. Water which is evaporated may be either condensed or additional water may be added to replace the amount lost. The boiling liquid sodium silicate solution is maintained at a temperature of about 100° C. and is vigorously agitated by either stirring or the boiling action in the dissolver. The solution of the crushed sodium silicate (water glass) is realized in approximately one hour with gas heat in the absence of internal stirring, and may be speeded-up somewhat by the addition of mechanical agitation. It has further been observed that with the above technique, a solution in excess of 93% of the water glass added to the dissolver is achieved.

The boiling liquid solution of sodium silicate containing about 25% sodium silicate is then introduced into a formulation and concentration vessel. The temperature in this vessel is maintained at between 100° and 102° C. To the boiling liquid sodium silicate solution there is then added a boric acid solution containing between about 5 and 35% boric acid and in an amount such that the ratio of boric acid to silicate is less than 0.1 part by weight boric acid to 1.0 part by weight silicate. The boric acid is preferably added as a boiling solution poured directly into the boiling silicate solution, in which it instantly forms a solid gel in the sodium silicate liquid. This gel is then broken up through agitation and dissolved through continued boiling and stirring, and results in a clear stable liquid of watery, low viscosity, consistency, which is not affected by temperature changes. The resulting solution has a solids content of approximately 27% although it may be concentrated by further boiling or vacuum concentration to up to 32% solids.

As a more specific example, 2300 grams of crushed sodium silicate ($Na_2O:3.25\ SiO_2$), having a mesh size of 20 mesh or smaller, are added to 4600 milliliters of water and the admixture is subjected to gas heat and brought to a rolling boil. It is observed that the sodium silicate forms a high temperature melt at the bottom of the vessel and gradually is dissolved in the water. Additional water is added to replace the water that has evaporated from the boiling, or a condenser is used to return evaporated water. A boric acid solution is formed by dissolving 75 grams of boric acid powder in 400 milliliters of water by boiling until the boric acid is completely dissolved. The boiling boric acid solution is then added to the boiling sodium silicate liquid, wherein it appears to instantly become a solid gel in the sodium silicate liquid, which gel is then broken up through further boiling and agitation, so that it is completely dissolved. The composition when cooled is a watery, low viscosity material that is not affected by temperature changes. When used as a binder it is waterproof and alkali leaching is not observed. Moreover, the binder is flexible for use as a coating and is an extremely strong bonding agent when used with asbestos, vermiculite, pearlite, sawdust or other wood waste products.

As an alternative to the formation of the sodium silicate solution, a commercial sodium silicate solution having a ratio of sodium to silica of 1 to 3.25 may be obtained as a liquid sodium silicate solution (Diamond Chemicals-silicate solutions No. 33 or No. 42, which solutions contain 37.9% of combined sodium (8.8%) and silica (29.1%), and 39.3% of combined sodium (9.3%) and silica (30%) respectively). The solutions are diluted to a solids content of about 27% sodium silicate and brought to a boil. Boric acid is then added as described above, and this procedure produces a bonding agent similar in appearance and properties to that described.

To illustrate the results of alkali leaching, boards prepared from the above-described binder and pearlite were soaked in water for 24 hours. It was then observed it took 8.3, 5.6, 3.3, and 3.0 milliliters of 0.5 normal sulfuric acid to neutralize the alkali extracted in that 24 hour period from 5 grams of pearlite boards prepared with a bonding agent containing the equivalent of 0, 25, 50, and 75 lbs. by weight of boric acid per 1000 parts by weight of sodium silicate. It was further observed that pearlite boards bonded with the above-described bonding agent withstood long periods (weeks) of soaking in water without crumbling. It has been further observed that the above-described bonding agent has an extremely long shelf life.

I claim as my invention:

1. A bonding agent composition consisting essentially of the reaction product of boric acid and sodium silicate, said silicate having a $Na_2O$ to $SiO_2$ ratio between about 1.0 $Na_2O:2.35\ SiO_2$ to 1.0 $Na_2O:3.5\ SiO_2$, said reaction product being produced by admixing an aqueous boiling sodium silicate solution containing in excess of about 25% by weight sodium silicate and a boiling aqueous boric acid solution containing between about 5 and 35% boric acid, continuing said boiling until a clear liquid is produced, said boric acid and silicate reaction product being formed from the reaction between 0.02 and 0.09 parts boric acid on a dry basis with one part sodium silicate on a dry basis.

2. A process for producing a clear, stable bonding agent comprising the steps of forming a boiling aqueous solution of sodium silicate containing in excess of about 25% by weight sodium silicate, forming a boiling aqueous solution of boric acid containing between about 5% and about 35% by weight boric acid, and mixing said boiling solutions, in respective amounts sufficient to provide a reacting mixture having a ratio of boric acid to sodium silicate of between 0.02 to 1 to about 0.09 to 1, continuing said boiling until a clear stable bonding agent is produced, and cooling said solution to room temperature.

3. A process for producing a clear, stable bonding agent comprising the steps of crushing sodium silicate glass, wherein the ratio of $Na_2O$ to $SiO_2$ is about 1 to 3.25, to a mesh size of 20 mesh or smaller; admixing said crushed silicate glass with water in respective amounts sufficient to produce a solution containing between about 25% to about 31% sodium silicate; boiling said admixture by the application of heat to the admixture sufficient to form a high temperature melt layer of sodium silicate glass surmounted to a boiling aqueous sodium silicate solution, continuing said heating to produce an aqueous sodium silicate solutions having said solids content between about 25% and about 31%; forming a boiling aqueous boric acid solution containing between about 5% and about 35% boric acid; adding said boiling boric acid solution to said boiling sodium silicate solution in an amount such that the admixture thereof contains a ratio of boric acid to sodium silicate of between about 0.02 to 1 to about 0.09 to 1; and continuing the boiling of said admixture with agitation thereof to produce a clear, stable, bonding agent composition having a solids content of between about 27% and about 31%.

References Cited

UNITED STATES PATENTS 3,069,277  12/1962  Teja _____ 106—74

JAMES E. POER, Primary Examiner

U.S. Cl. X.R.

106—84

UNITED STATES PATENT OFFICE
CERTIFICATE OF CORRECTION

Patent No. 3,498,807          Dated March 3, 1970

Inventor(s)  Ralph R. Gresham

It is certified that error appears in the above-identified patent and that said Letters Patent are hereby corrected as shown below:

Column 4, line 72, "to" should read -- by --.

SIGNED AND SEALED

JUL 7 1970

(SEAL)
Attest:

Edward M. Fletcher, Jr
Attesting Officer

WILLIAM E. SCHUYLER, JR.
Commissioner of Patents